United States Patent
Fleischer et al.

(10) Patent No.: US 12,040,864 B2
(45) Date of Patent: Jul. 16, 2024

(54) PASSIVE INTERMODULATION AWARE BEAMFORMING

(71) Applicant: Nokia Solutions and Networks Oy, Espoo (FI)

(72) Inventors: Marko Fleischer, Unterhaching (DE); Jan Hellmann, Munich (DE); Rene Roschke, Mammendorf (DE); Helmut Heinz, Turkheim (DE)

(73) Assignee: Nokia Solutions and Networks Oy, Espoo (FI)

(*) Notice: Subject to any disclaimer, the term of this patent is extended or adjusted under 35 U.S.C. 154(b) by 71 days.

(21) Appl. No.: 17/797,505

(22) PCT Filed: Feb. 10, 2020

(86) PCT No.: PCT/EP2020/053278
§ 371 (c)(1),
(2) Date: Aug. 4, 2022

(87) PCT Pub. No.: WO2021/160237
PCT Pub. Date: Aug. 19, 2021

(65) Prior Publication Data
US 2023/0081201 A1    Mar. 16, 2023

(51) Int. Cl.
H04B 7/06    (2006.01)
(52) U.S. Cl.
CPC ......... H04B 7/0617 (2013.01); H04B 7/0695 (2013.01)

(58) Field of Classification Search
CPC ..... H04B 7/0617; H04B 7/0695; H04B 7/088
See application file for complete search history.

(56) References Cited

U.S. PATENT DOCUMENTS

| 9,588,212 B1 | 3/2017 | Bradley | |
| 2017/0237484 A1* | 8/2017 | Heath | H04B 10/07953 398/26 |
| 2019/0174337 A1 | 6/2019 | Prasad et al. | |
| 2021/0185692 A1* | 6/2021 | Stephenne | H04W 72/1263 |

FOREIGN PATENT DOCUMENTS

WO    WO 2019/220179 A1    11/2019

* cited by examiner

Primary Examiner — David S Huang
(74) Attorney, Agent, or Firm — Harrington & Smith

(57) ABSTRACT

The present subject matter relates to an apparatus for a communication system. The apparatus is configured for: for each beam direction of a set of beam directions of an antenna array of the communication system, determining a level of a passive intermodulation, PIM, signal at a receiver of the communication system, the PIM signal being caused by a set of signals transmitted by the antenna array in the beam direction, identifying beam directions of the set of beam directions whose PIM level is higher than a predefined threshold, adapting a beamforming of signals in at least part of the identified beam directions to mitigate the PIM level at the receiver.

18 Claims, 6 Drawing Sheets

PASSIVE INTERMODULATION AWARE BEAMFORMING

CROSS REFERENCE TO RELATED APPLICATION

This patent application is a U.S. National Stage application of International Patent Application Number PCT/EP2020/053278 filed Feb. 10, 2020, which is hereby incorporated by reference in its entirety.

TECHNICAL FIELD

Various example embodiments relate to computer networking, and more particularly to passive intermodulation aware beamforming.

BACKGROUND

Intermodulation products may be generated in a wireless system when two or more signals at different frequencies are transmitted along a signal path including a component having a non-linear transmission characteristic; these products differ in frequency from the signals from which they were generated, and may potentially cause interference to other signals.

SUMMARY

Example embodiments provide an apparatus for a communication system. The apparatus is configured for: for each beam direction of a set of beam directions of an antenna array of the communication system, determining a level of a passive intermodulation, PIM, signal at a receiver of the communication system, the PIM signal being caused by a set of signals transmitted by the antenna array in the beam direction, identifying one or more beam directions of the set of beam directions whose determined PIM level is higher than a predefined threshold, adapting a beamforming of signals in at least part of the identified beam directions to mitigate the PIM level at the receiver.

According to further example embodiments, a method for a communication system is provided. The method comprises: for each beam direction of a set of beam directions of an antenna array of the communication system, determining a level of a passive intermodulation, PIM, signal at a receiver of the communication system, the PIM signal being caused by a set of signals transmitted by the antenna array in the beam direction, identifying one or more beam directions of the set of beam directions whose determined PIM level (or received PIM signal level) is higher than a predefined threshold, adapting a beamforming of signals in at least part of the identified beam directions to mitigate the PIM level at the receiver.

According to further example embodiments, a computer program comprising instructions stored thereon for performing at least the following: for each beam direction of a set of beam directions of an antenna array of the communication system, determining a level of a passive intermodulation, PIM, signal at a receiver of the communication system, the PIM signal being caused by a set of signals transmitted by the antenna array in the beam direction, identifying one or more beam directions of the set of beam directions whose determined PIM level is higher than a predefined threshold, adapting a beamforming of signals in at least part of the identified beam directions to mitigate the PIM level at the receiver.

According to further example embodiments, a system comprising an antenna array, a transmitter, a receiver and an apparatus. The antenna array comprises receiving antenna elements of the receiver and transmitting antenna elements of the transmitter. The apparatus is configured for: for each beam direction of a set of beam directions of an antenna array of the communication system, determining a level of a passive intermodulation, PIM, signal at a receiver of the communication system, the PIM signal being caused by a set of signals transmitted by the antenna array in the beam direction; identifying one or more beam directions of the set of beam directions whose determined PIM level is higher than a predefined threshold, adapting a beamforming of signals in at least part of the identified beam directions to mitigate the PIM level at the receiver.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
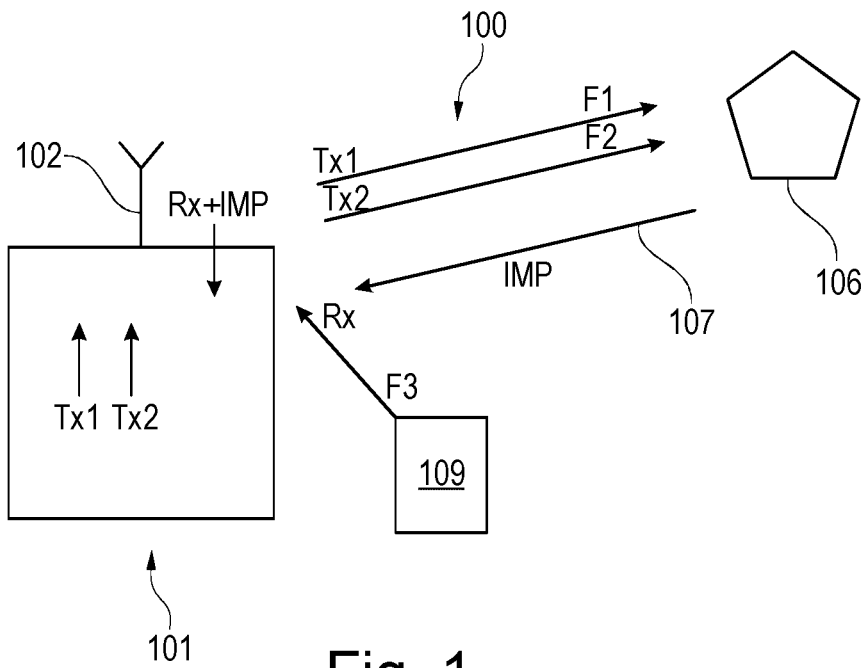
FIG. 1 depicts a diagram of a communication system.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

The beam of the antenna array may hit PIM obstacles while steering the beam towards moving receiving devices or switching the beam towards different receiving devices. PIM obstacles may be metallic objects. Metallic objects in the vicinity of a radiating antenna array may cause PIM distortions with similar frequencies than uplink channels. For example, the energy densities, such as effective isotropic radiated powers (EIRPs), which are created where the beam is pointing may be so high that metallic objects of the communication system even further away cause a TX carrier mixing over the air (the higher the beam energy densities the more fare away PIM objects may cause issues). PIM obstacles may thus cause uplink (UL) sensitivity degradation in dependence of the uplink and downlink beam directions of the beam. The present subject matter may solve this issue by changing the beamforming at the transmitter and/or receiver for the beam directions that, for example, coincident with PIM obstacles. The received signal power or signal-to-noise ratio (SNR) at an intended receiver may thus be improved. This may particularly be advantageous in multi-user massive multiple input multiple output (MIMO) 4G/5G beamforming frequency division duplex (FDD) systems (e.g. the system may be a system using MIMO and FDD technique) where the PIM effect may be mostly observed. The receiver may for example be part of the apparatus. The apparatus, the transmitters and the antenna array may be part of the communication system. The receiver may be configured to process multiple signals received at multiple receiving antenna elements of the antenna array. The PIM signal that is caused by the set of signals transmitted by the antenna array may fall in a receive band of the receiver.

Two directions are coincident directions if the difference between the two directions fulfills a predefined coincidence criterion. Said difference may, for example, be a distance or angular distance between the two directions. The coincidence criterion may, for example, require that the distance is smaller than or equal to a coincidence threshold. If the distance is higher than the coincidence threshold, the two directions are not coinciding. The directions may for example be defined by an azimuth angle $\Phi$ and/or an elevation angle $\vartheta$ with respect to the antenna array. The azimuth angle $\Phi$ and elevation angle $\vartheta$ may be defined in a predefined coordinate system e.g. with the x-y plane parallel to the ground and the z-axis vertically upward from the ground. The azimuth angle may, for example, vary between −30° and 30° and the elevation angle may vary between −10° and 10°.

The beamforming may relate to a spatial filtering mechanism, which may be used at transmitting antenna elements and/or receiving antenna elements of the antenna array to improve one or more attributes, e.g., the received signal power or SNR at an intended receiver. The beamforming may be used for directional signal transmission and/or reception. The beam direction may be defined by an azimuth angle $\Phi$ and/or an elevation angle $\vartheta$ with respect to the antenna array.

Each antenna element of the antenna array may be fed separately with a signal to be transmitted or received. The beamforming may be performed using beamforming settings. The beamforming settings may, for example, comprise weights of magnitudes and/or phases. The beamforming may be performed to obtain a maximum signal strength in a beam direction of a radiation pattern of the antenna array. The beam direction may be a direction of a beam, wherein the beam may be the main lobe of the radiation pattern. The beamforming may comprise a manipulation of the phase and magnitude of each signal (in accordance with beamforming settings) in such a way that the signals concentrate the energy into a narrow beam having the beam direction. In one example, the beamforming settings may be determined by the apparatus on the fly for performing the adapting step of the present subject matter. In another example, the manipulation of the phase and magnitude may be performed in accordance with predefined and stored beamforming settings in order to perform the adapting step of the present subject matter e.g. different stored beamforming settings may be associated with different configurations, wherein a configuration may indicate directions of PIM sources and directions of receiving and/or transmitting devices.

For example, based on a current direction ($\Phi 0$, $\vartheta 0$) of a receiving device, the beamforming may be performed by controlling beamforming settings of transmitting antenna elements of the antenna array to generate a directional beam directed in a given direction ($\Phi 2$, $\vartheta 2$) so that the receiving device can receive data via the directional beam. If the current direction of the receiving device does not coincide with the identified beam directions, the given direction may be the current direction i.e. ($\Phi 2$, $\vartheta 2$)=($\Phi 0$, $\vartheta 0$). However, if the current direction ($\Phi 0$, $\vartheta 0$) corresponds with one or more of the identified beam directions, the given direction may be determined in accordance with the present subject matter using the current direction i.e. ($\Phi 2$, $\vartheta 2$) is different from ($\Phi 0$, $\vartheta 0$).

In one example, the set of beam directions may comprise directions of candidate PIM sources of the communication system. By using only candidate PIM sources directions, which are known to a user, processing resources that would otherwise be required for scanning a whole range of directions (e.g. if the user does not know the location of PIM sources) may be saved. In one example, the set of beam directions may comprise directions in which the antenna array can send signals e.g. in the range −30° to 30° of the azimuth angle. By scanning all possible reachable directions, an accurate determination of all PIM levels may be enabled. This may enable to increase the quality of signal reception in the communication system. In one example, the set of beam directions may comprise user defined directions.

The PIM signal may be determined using a measurement method. The measurement method may comprise: measuring a first noise power level at the receiver while the signal transmission by the transmitter is switched off or disabled, radiating PIM causing signals from the transmitter in a particular direction, measuring a second power level at the receiver after the radiating, comparing the first and second power levels, and based on the difference between the first and second power levels determining a PIM level for the particular direction. For example, if the difference between the first and second power levels is higher than the threshold, there may be an indication of a PIM source and the difference may be used as the PIM level.

According to an example, the signals comprise downlink signals to a receiving device. The receiving device has a direction that coincides with one of the identified beam directions. The means is configured to perform the adapting comprising generating one or more beam directions which are closest directions to the direction of the receiving device and are not coinciding the one of the identified beam directions, and adapting beamforming settings of transmitting antenna elements of the antenna array in accordance with the generated directions. The at least part of the identified beam directions is the one of the identified beam directions.

The set of identified beam directions may be named $DIR_{pim}^i$, where i varies between 1 and the total number of the identified beam directions. The direction of the receiving device may be named $DIR_{rec}$ and may coincide with the one of the identified beam directions e.g. which is $DIR_{pim}^2$. The direction $DIR_{rec}$ coincides with direction $DIR_{pim}^2$ if, for example, an angular distance, denoted as $|DIR_{rec}-DIR_{pim}^2|$ for simplification of the description, between the two directions is smaller than or equal to the coincidence threshold $T_{coinc}$. If, for example, the angular distance $|DIR_{rec}-DIR_{pim}^2|$ is higher than $T_{coinc}$, the two directions do not coincide.

The generated one or more directions may be named $DIR_{gen}^j$, where $j \geq 1$. The generated directions $DIR_{gen}^j$ in accordance with this embodiment are the closest directions to $DIR_{rec}$ which are not coinciding with the one of the identified beam directions $DIR_{pim}^2$ i.e. $DIR_{gen}^j$ is the closest direction to $DIR_{rec}$ that fulfils $|DIR_{gen}^j-DIR_{pim}^2|>T_{coinc}$.

The adapting of the beamforming settings of the antenna array in accordance with the generated directions may for, example, enable directing beams toward the one or more generated beam directions. For example, instead of forming a beam toward the direction $DIR_{rec}$, for transmitting data to the receiving device, the beams are directed toward the one or more generated beam directions $DIR_{gen}^j$ using the adapted beamforming settings.

The one or more generated directions $DIR_{gen}^j$ may comprise two directions. The two directions may for example be symmetrically distributed around the identified beam direction $DIR_{pim}^2$ e.g. $DIR_{gen}^1=DIR_{pim}^2-\Delta_{dir}$ and $DIR_{gen}^2=DIR_{pim}^2+\Delta_{dir}$. This may further improve the received signal power or SNR at an intended receiver.

In one example, for each identified beam direction of the at least part of the identified beam directions, the means is configured to configure the beamforming of the antenna array by determining two beam directions surrounding the identified beam direction and adapting beamforming settings of the antenna array so that the antenna array redirects a beam destined to a receiving device having a direction coinciding with the identified beam direction, the redirecting being performed to the two determined beam directions. The surrounding directions may for example be defined as described above with $DIR_{gen}^1$ and $DIR_{gen}^2$.

According to an example, the signals comprise downlink signals to a receiving device. The means is configured to perform the adapting comprising adapting beamforming settings of transmitting antenna elements of the antenna array for notching a beam in each direction of the at least part of the identified beam directions. The beam may be formed so that the receiving device can receive the signals. Notching the beam in a particular direction may comprise a manipulation of the phase and magnitude of each signal of the downlink signals so that the antenna array radiates almost no radio power in said particular direction e.g. the radio power in said particular direction is smaller than a power threshold. Said particular direction may be a null.

According to an example, the at least part of the identified beam directions may be a direction that coincides with the direction of the receiving device.

According to an example, the at least part of the identified beam directions may be a direction (e.g. $DIR_{pim}^1$) that does not coincide with the direction of the receiving device and that is one of: a closest direction to the direction of the receiving device or a direction having the highest determined PIM level. In this example, the direction of the receiving device does not coincide with any direction of the identified beam directions.

If, for example, the identified beam directions are more than one direction, the direction $DIR_{pim}^1$ may be the closest identified direction to the direction $DIR_{rec}$ of the receiving device. The closest direction $DIR_{pim}^1$ of the identified directions to the direction $DIR_{rec}$ of the receiving device may not be coinciding with the receiving device e.g. $|DIR_{rec}-DIR_{pim}^1|>T_{coinc}$. This embodiment may enable to adapt beamforming in case of a receiving device that is close to a PIM source.

According to an example, the means is configured for selecting the at least part of the identified beam directions based on the PIM levels. This may save processing resources that would otherwise be required for adapting the beamforming for each beam direction of the identified beam directions. For example, the nulling of beams toward the selected beam directions may be performed by recalculating phase and magnitude values for the receiving and/or transmitting antenna elements of the antenna array for adapting the beamforming of the antenna array accordingly.

According to an example, for each identified beam direction of the at least part of the identified beam directions, the means is configured to configure the beamforming of the antenna array by adapting weightings of magnitude and/or phase associated with the identified beam direction. The configuration of the beamforming may, for example, be performed for nullifying the beam in the identified beam direction or by generating the two (redirecting) beams directions for the identified beam direction.

According to an example, the antenna array comprises a number of transmitting and receiving antenna elements higher than a predefined minimum number of antenna elements. For example, the antenna array comprises at least 8×8 transmitting antenna elements and 8×8 receiving antenna elements. This may further increase the beamforming accuracy in accordance with the present subject matter. This may for example be advantageous in case of adapting the beamforming in accordance with more than one generated beam direction.

According to an example, the signals comprise uplink signals from a transmitting device. The means is configured to perform the adapting comprising adapting beamforming settings of receiving antenna elements of the antenna array for notching a beam in one direction (e.g. $DIR_{pim}^4$) of the identified beam directions that does not coincide with a direction $DIR_{trs}$ of the transmitting device. Notching the beam in a particular direction may comprise a manipulation of the phase and magnitude of each signal of the uplink signals so that the antenna array receives almost no radio power in said particular direction e.g. the radio power in said particular direction is smaller than a power threshold.

According to an example, the at least part of the identified beam directions may be a direction that does not coincide with the direction of the transmitting device and that is one of: a closest direction to the direction of the transmitting device, a direction having the highest determined PIM level.

According to an example, the signals further comprise downlink signals to the transmitting device. The means is configured to perform the adapting comprising adapting beamforming settings of transmitting antenna elements of the antenna array for notching a beam in each direction of the at least part of the identified beam directions.

If, for example, the identified beam directions are more than one direction, the direction $DIR_{pim}^4$ may be the closest identified direction to the direction $DIR_{trs}$ of the transmitting device. The closest direction $DIR_{pim}^4$ of the identified directions to the direction $DIR_{trs}$ of the transmitting device may not be coinciding with the direction of the transmitting device e.g. $|DIR_{trs}-DIR_{pim}^4|>T_{coinc}$.

According to an example, the one or more generated beam directions $DIR_{gen}^j$ are beam directions of a first beam of a subset of the signals toward the receiving device. The signals may cause PIM at the receiver. The means is configured to perform the adapting further comprising adapting beamforming settings of transmitting antenna elements of the antenna array for forming a second beam for another subset of the signals toward another receiving device. The second beam has a direction $DIR_{b2}$ different from the generated directions(s). For example, the angular distance between the direction of the second beam $DIR_{b2}$ and each of $DIR_{gen}^j$ is higher than a predefined inter-beam distance threshold. The two subsets of signals (TX1, TX2) of the two beams may have different transmission frequency bands or have different carriers in the same frequency band. For example, transmitted signals TX1 and TX2, which are causing PIM, are scheduled onto different TX beams, beam1 and beam2, in a multibeam system, wherein beam1 and beam2 are scheduled in a way that they are not looking at the same time in the same PIM direction. This may enable to serve two receiving devices at the same time e.g. the two beams may be associated with downlink signals toward respective receiving devices.

According to an example, the signals further comprise uplink signals from a transmitting device. The means is configured to perform the adapting further comprising adapting beamforming settings of receiving antenna elements of the antenna array for forming a beam having a direction different from the one of the identified beam directions e.g. $DIR_{pim}^2$. This embodiment may enable to serve multiple devices at the same time. For example, if a transmitted signal TX direction points towards a PIM source, the RX beam may not point into the same direction and may point into a direction of the transmitting device.

FIG. 1 depicts a diagram of a communication system 100. The communication system 100 comprises a transceiver system 101. The transceiver system 101 may be a base station for a cellular communication network, but is not limited thereto. The transceiver system 101 may, for example, be a multi-carrier or multi-band system (e.g., a system that simultaneously operates in at least two different transmission frequency bands or at least two carriers in the same frequency band).

The transceiver system 101 is configured to send a set of signals via an antenna 102. For simplification of the description, only one antenna is shown but it is not limited to. Although only a set of two signals Tx1 and Tx2 is illustrated for this particular example, it should be appreciated that the set of signals may comprise more than two signals.

The set of signals Tx1 and Tx2 are transmitted at frequencies F1 and F2 respectively. However, intermodulation products may be generated when the set of signals Tx1 and Tx2 are transmitted along a signal path including a source of PIM. The sources of PIM may be outside the transceiver system triggering an air induced PIM. In another example, the sources of PIM may further include a source that is inside the transceiver system inducing a conducted PIM affecting equally all signals of a same frequency band. The air induced PIM may be caused by sources of PIM at predefined distances to the transceiver system 101. For example, in case of a transceiver system of a MIMO installation with several transmit signals, the transmit signals on the same frequency may cause higher power spectrum densities and thus metallic objects in a 10 m distance or more from the transceiver system 101 are not negligible and can cause uplink (UL) desensitization and throughput losses.

In the example shown in FIG. 1, the set of signals Tx1 and Tx2 impinge upon a source of PIM 106. The source of PIM 106 may, for example, be a metallic component comprising a ferromagnetic material. IM products 107 of the set of signals Tx1 and Tx2 are generated due to the non-linear response of the source of PIM 106.

The set of signals Tx1 and Tx2 may produce, for example, third order IM products at frequencies 2F1-F2 and 2F2-F1, fifth order IM products at frequencies 3F1-2F2 and 3F2-2F1 and other products. This provides relationships between signal frequencies, e.g. F1 and F2, and the frequencies of IM products produced from those frequencies. FIG. 1 shows that IM products 107 of the set of signals Tx1 and Tx2 are transmitted from the source of PIM 106. The transmission of the IM products 107 may be performed at a respective frequency of the IM products 107.

The IM products 107 fall at least in part, within a received channel at frequency F3 and appear as interference to a received signal Rx that is transmitted at radio frequency from, for example, a user equipment 109 in communication with the transceiver system 101.

Figure 2:
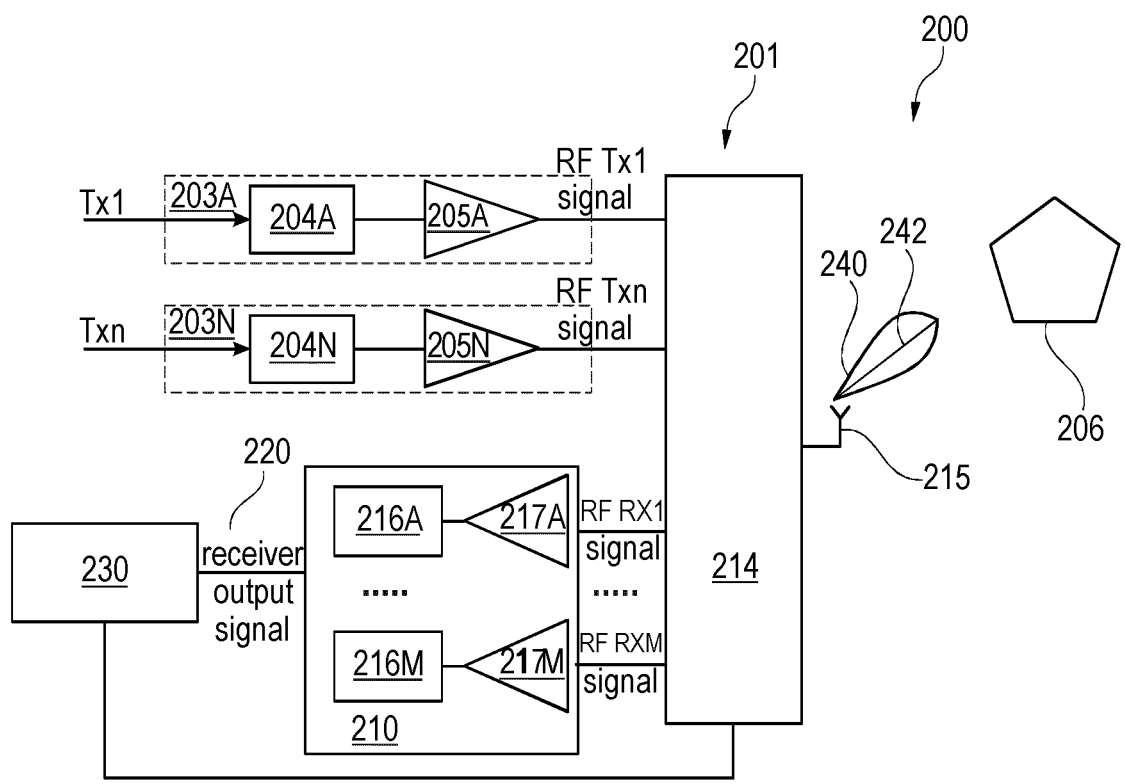
FIG. 2 depicts a diagram of a communication system in accordance with an example of the present subject matter.

FIG. 2 depicts a diagram of a communication system 200 in accordance with an example of the present subject matter. The communication system 200 may for example be a MIMO radio system. The communication system 200 comprises a transceiver system 201. The transceiver system 201 includes multiple transmitters 203A-N and a receiver 210 coupled to an antenna array 215 or antenna with multiple antenna elements. The antenna array 215 comprises receiving antenna elements and transmitting antenna elements. For example, each subset of transmitters 203A-N may be coupled to respective antenna elements 215. Each subset of transmitters may be configured to transmit data in a respective transmission frequency band (referred to as TX band). The TX bands may for example comprise long term evolution (LTE) bands 14, 17 and 29. By isolating each data stream of the transmitters 203A-N quality problems may be mitigated. The transmitters 203A-N and the receiver 210 may be coupled to the antenna array 215 via a duplexer 214. The signals captured by the receiving antenna elements of the antenna array 215 may be received at the receiver 210 of the transceiver system 201.

FIG. 2 shows only one transceiver system but it is not limited to. For example, the communication system 200 may comprise multiple transceiver systems such as the transceiver system 201.

Each of the transmitters 203A-N includes a digital-to-analog (D/A) converter 204A-N and a power amplifier (PA) 205A-N connected as shown. Each of the transmitters 203A-N operates to process a respective digital input signal Tx1-Txn, which may for example be a digital baseband signal, to output a radio frequency transmit signal. The processing of the digital input signal may for example comprise a crest factor reduction (CFR) and digital predistortion processing. The radio frequency transmit signal of each of the transmitters 203A-N passes through the duplexer 214 to a respective transmitting antenna element of the antenna array 215 such that the radio frequency transmit signal is transmitted by the transceiver system 201.

In the example of FIG. 2, a source of PIM 206 creating an air induced PIM is depicted. After being output, the radio frequency transmit signals pass through or impinge upon the source of PIM 206. Due to the non-linearity of the source of PIM, the PIM may be introduced into a radio frequency receive signal received at the receiver 210 via the antenna array 215 (the PIM signal falls in the receive band of the receiver 210 e.g. as shown in FIG. 1). The PIM may comprise IM products of the radio frequency transmit signals. The IM products include 3rd order IM products, fifth order IM products, etc.

The receiver 210 may, for example, include receiver components such as low-noise amplifiers (LNA) 217A-M, filters, a down-conversion circuitry, an analog-to-digital converters 216A-M, and the like. The receiver 210 operates to process (e.g., amplify, filter, down-convert, and analog-to-digital convert) radio frequency receive signals received from the receiving antenna elements of the antenna array 215 via the duplexer 214 to output a digital output signal 220, which is referred to herein as a receiver output signal 220.

The IM products of the radio frequency transmit signals produced by the source of PIM that fall within a passband of the receiver 210 result in a PIM distortion in the receiver output signal 220 that is output by the receiver 210.

The PIM distortion, which is a digital signal referred to herein as a PIM signal or interference signal, may be measured or determined. The PIM signal is determined by an apparatus 230. The apparatus 230 may be part of the transceiver system 201 e.g. the apparatus 230 may be integrated in an antenna system of the transceiver system 201. Being part of the transceiver system 201 may enable an individual adaptation of the apparatus for different transceiver systems. In another example, the apparatus 230 may not be part of the transceiver system 201. This may enable a centralized and thus consistent control of PIM effects among different transceiver systems.

The apparatus 230 is configured to receive the receiver output signal 220. The apparatus 230 is configured to receive radio frequency transmit signals transmitted through the air by transmitters of the transmitters 203A-N. The apparatus 230 is configured to determine the PIM signal and its level. In case of multiple transceiver systems, the apparatus 230 may be configured to determine the PIM signal for the receiver of each of the transceiver systems.

The apparatus 230 may control the antenna array 215 to generate a directional beam 240 directed in a beam direction 242 e.g. to communicate via a wireless access link. The beamforming may be performed using beamforming settings associated with each beam direction. The beamforming settings may for example comprise weights of magnitudes and/or phases associated with the antenna elements of the antenna array 215. The apparatus 230 may be configured to control the antenna array 215 to steer the directional beam 240 in a beam direction 242 e.g. between 0 and 90 degrees. The apparatus 230 may control the antenna array 215 to steer the directional beam 240 by configuring beamforming settings of the antenna array 215. For example, the apparatus 230 may configure the beamforming settings of the antenna array 215 by adjusting phase shifts to be applied to the antenna elements of the antenna array 215. Adjusting the phase shifts may enable to determine and/or control a width, gain and/or direction of the directional beam 240. The adjusting of the phase may, for example, be performed in the digital domain or via an extra RF phase shifter.

The apparatus 230 may readjust the beamforming settings of the antenna array 215, for example, based on PIM levels in accordance with the present subject matter. For example, the apparatus 230 may control the steering of the directional beam 240 to a given direction, e.g., of a receiving device. The transceiver system 201 may be configured to track the movement of a mobile device and to steer the directional beam 240 based on the movement. The apparatus 230 may be configured to control and steer the directional beam 240 in an azimuth angle and/or in an elevation angle with respect to the antenna array 215. For example, the azimuth angle of the directional beam 240 may be steered if a mobile device moves clockwise with respect to transceiver system 201. The elevation angle of the directional beam 240 may be steered, if, for example, a mobile device moves away from or towards transceiver system 201. In another example, both the elevation angle and the azimuth angle of the directional beam 240 may be steered if a mobile device moves upward or downward together with a clockwise movement with respect to the transceiver system 201.

Figure 3:
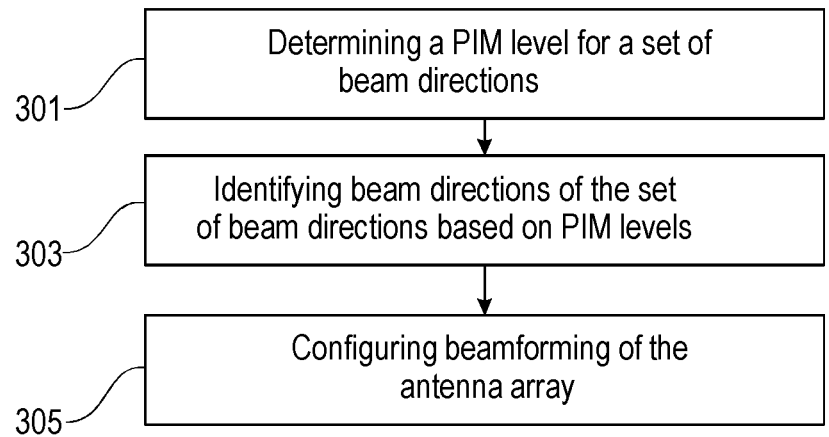
FIG. 3 is a flowchart of a method for processing intermodulation products in accordance with an example of the present subject matter.

FIG. 3 is a flowchart of a method for processing intermodulation products in a communication system e.g. 200. For the purpose of explanation, the method may be implemented in the system illustrated in previous FIGS. 1-2, but is not limited to this implementation.

For each beam direction of a set of beam directions of an antenna array e.g. 215 of the communication system 200, a level of a PIM signal at the receiver 210 of the communication system 200 may be determined in step 301. The PIM signal may be caused by a set of signals transmitted by the transmitting antenna elements of the antenna array 215 in the beam direction. The apparatus 230 may for example determine the PIM levels at the set of beam directions by determining the PIM signals associated with the beam directions of the set of beam directions. In another example, the apparatus 203 may be configured to access a database storing information about PIM levels at the receiver 210 for different beam directions. The PIM levels may be determined by the apparatus 230 using the database.

The beam direction may be defined by an azimuth angle and/or an elevation angle with respect to the antenna array 215. The set of beam directions may be directions for which beamforming settings may be defined or for which beamforming settings are available in the communication system. For example, for each individual pair of azimuth and elevation angles ($\Phi$, $\vartheta$), the received power in the associated RX channel of the receiver 210 is measured and compared against a noise/interference reference level in order to determine the PIM level.

Figure 4:
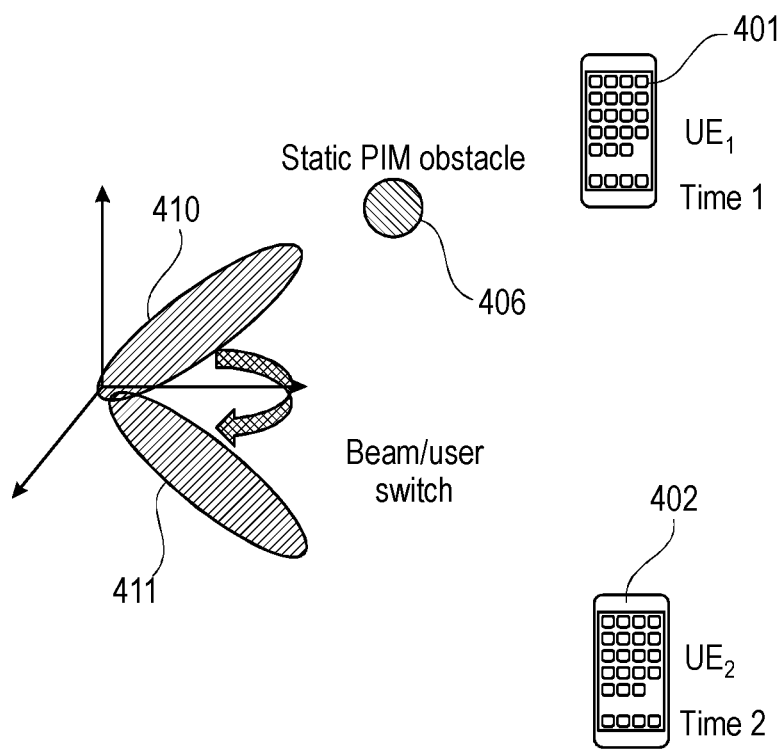
FIG. 4 depicts a diagram illustrating the effect of a PIM source on the beamforming.

Step 301 may, for example, result in each direction of the set of beam directions being associated with a respective value of the PIM level. This result may be provided as a map or table. In another example, the result may be presented in a heatmap plot with color-coding indicating directions with PIM noise issues or PIM levels above a predefined threshold. For example, as shown with FIG. 4, a beam 410 destined to the first UE 401 may hit a PIM obstacle 406 and thus induce a PIM signal in the receiver 210 of the communication system. However, the beam 411 may directly reach the second UE 402 without hitting the PIM obstacle 406. Thus, the PIM level in the beam direction of the second UE 402 may be smaller than the PIM level in the beam direction of the first UE 401. The two UE directions may thus have different quality of signal reception e.g. when switching the beam direction from the first UE to the second UE.

The determination of the PIM levels may be performed after radio/system deployment of the communication system. For example, step 301 may be performed in an offline calibration step. The term "offline" may, for example, mean that there is no active service and no elevated RX noise level due to a radiation.

Beam directions of the set of beam directions whose PIM level is higher than a predefined threshold may be identified in step 303. In one example, the number of identified beam directions may not exceed a predefined maximum number, because processing a high amount of PIM sources may be resource consuming. This is due, for example, to the fact that additional nulling/notching may require an additional complexity inside the beamforming system. For that, a ranking of the PIM levels of the identified beam directions may be performed and the first N highest PIM levels may be selected. The number N may be user defined e.g. N=2. The beam directions of the identified beam directions associated with the selected PIM levels may be selected and provided.

A beamforming of signals may be adapted in step 305 for at least part of the identified beam directions to mitigate the PIM level at the receiver 210. For example, the signals may comprise uplink signals from a transmitting device and/or downlink signals to a receiving device, wherein the beamforming is adapted by comparing the direction of the transmitting device and/or the direction of the receiving device with the at least part of the identified beam directions.

In one first example, and in case the direction of the receiving device does not coincide with any direction of the at least part of the identified beam directions, a nulling or notching of a beam may be performed towards a given identified direction of the at least part of the identified directions. The given identified direction may be the closest direction to the receiving device. The nulling may be performed at the receiver and/or transmitter by adapting beamforming settings of the receiving antenna elements and/or transmitting antenna elements of the antenna array respectively. In this first example, the at least part of the identified beam directions may be the given identified direction.

In one second example, and in case the direction of the receiving device coincides with a particular direction of the at least part of the identified beam directions, a nulling or notching of a beam towards said particular direction of the at least part of the identified directions may be performed. The nulling may be performed at the receiver and/or transmitter by adapting beamforming settings of the receiving antenna elements and/or transmitting antenna elements of the antenna array respectively. In this second example, the at least part of the identified beam directions may be the particular direction.

In another example, the at least part of the identified beam directions may be the selected beam directions. In case, the direction of the receiving device does not coincide with any direction of the at least part of the identified beam directions, a nulling or notching of a beam towards each direction of the at least part of the identified directions may be performed.

In another example, the at least part of the identified beam directions comprises all identified beam directions of step 303. In case, the direction of the receiving device does not coincide with any direction of the at least part of the identified beam directions, a nulling or notching of a beam towards each direction of the at least part of the identified directions may be performed.

The beamforming may be adapted at the antenna array. The beamforming may, for example, be adapted as described with reference to FIGS. 6A and 6B.

Figure 5:
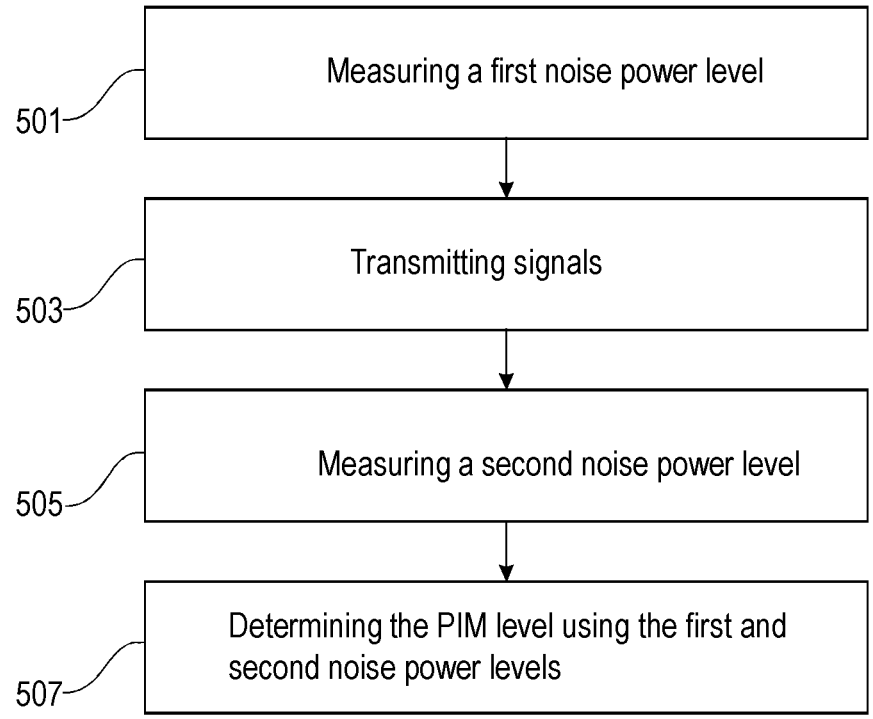
FIG. 5 is a flowchart of a method for determining a PIM signal in accordance with an example of the present subject matter.

FIG. 5 is a flowchart of a method for determining the PIM levels in a communication system e.g. 200. For the purpose of explanation, the method may be implemented in the system illustrated in previous FIGS. 1-2, but is not limited to this implementation.

For example, the method may be performed using the apparatus 230. In step 501, a first noise power level may be measured at the receiver 210 while the signal transmission by the communication system is switched off. In step 503, PIM causing signals may be transmitted by the transmitters in a particular direction. A second power level may be measured in step 505 at the receiver after step 503. The first and second power levels may be compared and based on the difference between the first and second power levels a PIM level may be determined in step 507 for the particular direction. Steps 501 to 507 may be repeated for each direction of the set of beam directions.

Figure 6A:
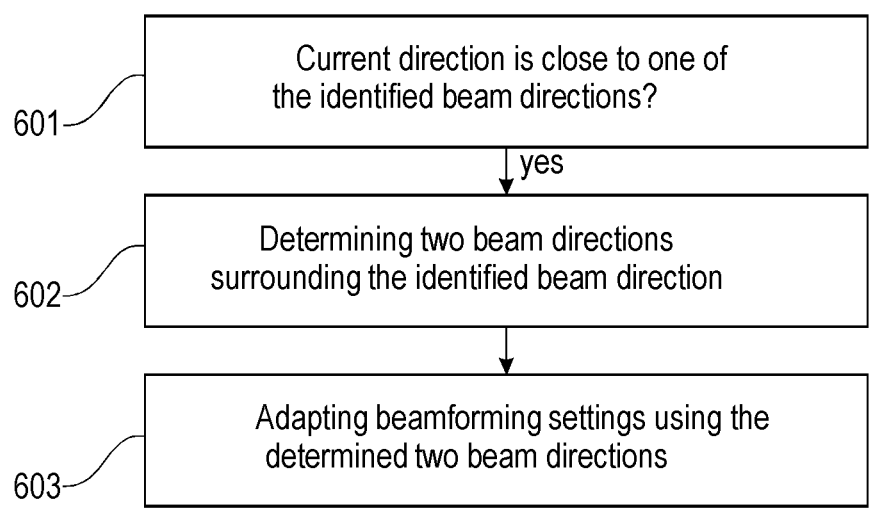
FIG. 6A is a flowchart of a method for configuring a beamforming of an antenna array in accordance with an example of the present subject matter.
Figure 6B:
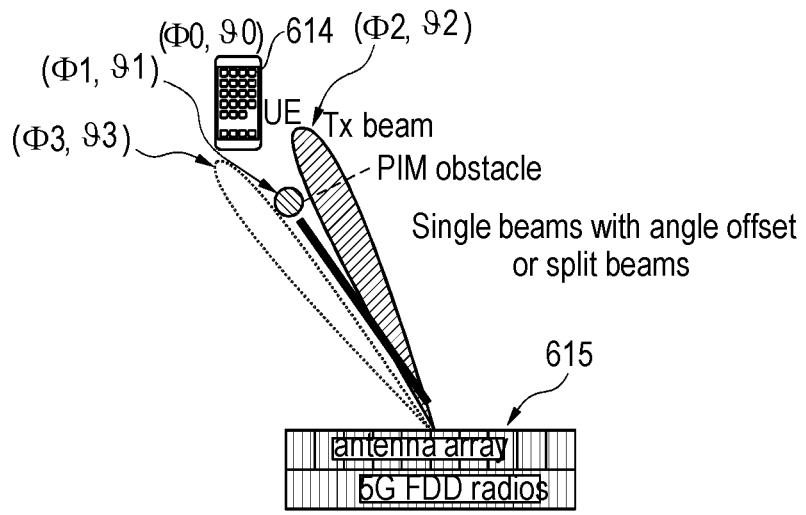
FIG. 6B depicts a diagram illustrating a beamforming in accordance with an example of the present subject matter.

FIG. 6A is a flowchart of a method for configuring a beamforming of an antenna array e.g. 215 in accordance with an example of the present subject matter. The method of FIG. 6A may be performed for a given beam direction ($\Phi 0$, $\vartheta 0$) as shown in FIG. 6B e.g. the given beam direction may be a current direction of a receiving device 614 of FIG. 6B that is expected to receive signals from the antenna array 615.

The given beam direction ($\Phi 0$, $\vartheta 0$) may be compared with each of the identified beam directions of step 303. For example, the angular distance between the pair of angles ($\Phi 0$, $\vartheta 0$) and each pair of angles of the identified beam directions may be computed. If the distance is smaller than the coincidence threshold, this indicates that the receiving device 614 coincides with a PIM source. In other words, this indicates that the given beam direction ($\Phi 0$, $\vartheta 0$) coincides with one of the identified beam directions e.g. ($\Phi 1$, $\vartheta 1$).

In case (inquiry step 601) the given beam direction ($\Phi 0$, $\vartheta 0$) coincides with one identified beam direction e.g. ($\Phi 1$, $\vartheta 1$), two beam directions surrounding the identified beam direction ($\Phi 1$, $\vartheta 1$) may be generated in step 602. For example, as shown in FIG. 6B, two beam directions ($\Phi 2$, $\vartheta 2$) and ($\Phi 3$, $\vartheta 3$) may be obtained by shifting at least one of the two angles ($\Phi 1$, $\vartheta 1$) of the identified beam direction e.g. $\Phi 2 = \Phi 1 + d12$, $\vartheta 2 = \vartheta 1 + d22$, $\Phi 3 = \Phi 1 - d12$, and $\vartheta 3 = \vartheta 1 - d22$. d12 and d22 may, for example, be user defined shifts. The shift may be performed so that the distance (e.g. $|(\Phi 2, \vartheta 2) - (\Phi 1, \vartheta 1)|$ and $|(\Phi 3, \vartheta 3) - (\Phi 1, \vartheta 1)|$) between each of the generated beam directions ($\Phi 2$, $\vartheta 2$) and ($\Phi 3$, $\vartheta 3$) and the identified beam direction ($\Phi 1$, $\vartheta 1$) is larger than the coincidence threshold and that are still close to the direction ($\Phi 0$, $\vartheta 0$). That is, ($\Phi 2$, $\vartheta 2$) and ($\Phi 3$, $\vartheta 3$) are the closest directions to ($\Phi 0$, $\vartheta 0$) which do not coincide with ($\Phi 1$, $\vartheta 1$).

Beamforming settings of the transmitting antenna elements of the antenna array 215 may be adapted in step 603 so that the antenna array can direct a beam, destined to the given beam direction ($\Phi 0$, $\vartheta 0$), to the two determined beam directions ($\Phi 2$, $\vartheta 2$) and ($\Phi 3$, $\vartheta 3$). For example, the apparatus may control the transmitting antenna elements of the antenna array 615 to perform beamforming in the determined two beam directions ($\Phi 2$, $\vartheta 2$) and ($\Phi 3$, $\vartheta 3$). This is for example illustrated in FIG. 6B, where two beams are directed to the beam directions ($\Phi 2$, $\vartheta 2$) and ($\Phi 3$, $\vartheta 3$).

For example, the apparatus may provide a data structure, e.g. table, that maps each of the identified beam directions e.g. ($\Phi 1$, $\vartheta 1$) to a corresponding determined pair of directions e.g. ($\Phi 2$, $\vartheta 2$) and ($\Phi 3$, $\vartheta 3$). Upon determining that the receiving device 614 is in a current direction ($\Phi 0$, $\vartheta 0$) and that ($\Phi 0$, $\vartheta 0$) coincides with an identified beam direction ($\Phi 1$, $\vartheta 1$), the apparatus may use the data structure to determine that the direction ($\Phi 1$, $\vartheta 1$) is associated with the pair of directions ($\Phi 2$, $\vartheta 2$) and ($\Phi 3$, $\vartheta 3$) and may thus control the antenna array using precomputed beamforming settings associated with the directions ($\Phi 2$, $\vartheta 2$) and ($\Phi 3$, $\vartheta 3$).

Figure 7A:
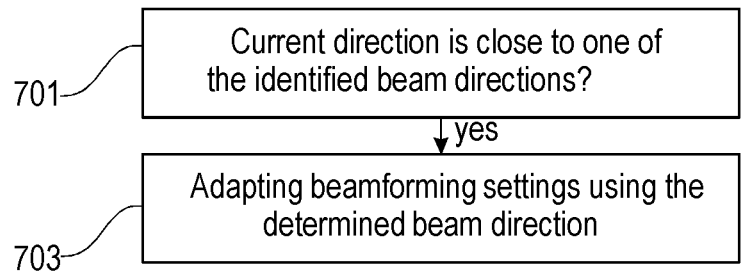
FIG. 7A is a flowchart of a method for configuring a beamforming of an antenna array in accordance with an example of the present subject matter.

FIG. 7A is a flowchart of a method for configuring a beamforming of an antenna array in accordance with an example of the present subject matter. The method of FIG. 7A may be performed for a given beam direction ($\Phi 0$, $\vartheta 0$) as shown in FIG. 7B e.g. the given beam direction may be a current direction of a receiving device 714 of FIG. 7B that is expected to receive signals from the antenna array 715.

The given beam direction ($\Phi 0$, $\vartheta 0$) may be compared with each of the identified beam directions of step 303. For example, the distance between the pair of angles ($\Phi 0$, $\vartheta 0$) and each pair of angles of the of the identified beam directions may be computed. If the distance is smaller than the coincidence threshold, this indicates that the receiving device 714 coincides with a PIM source. In other words, this indicates that the given beam direction ($\Phi 0$, $\vartheta 0$) coincides with one of the identified beam directions e.g. ($\Phi 1$, $\vartheta 1$).

Figure 7B:
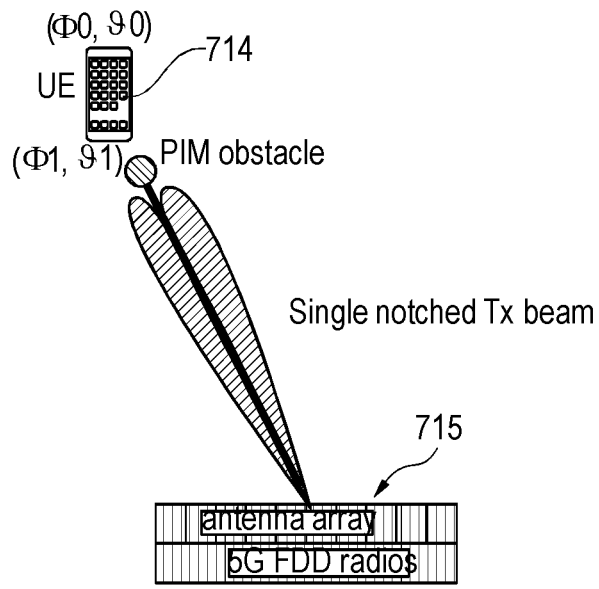
FIG. 7B depicts a diagram illustrating a beamforming in accordance with an example of the present subject matter.

In case (inquiry step 701) the given beam direction ($\Phi 0$, $\vartheta 0$) coincides with one identified beam direction e.g. ($\Phi 1$, $\vartheta 1$), beamforming settings of the transmitting antenna elements of the antenna array 715 may be adapted in step 703 for notching a beam (as illustrated in FIG. 7B) towards the identified beam direction ($\Phi 1$, $\vartheta 1$).

Figure 8:
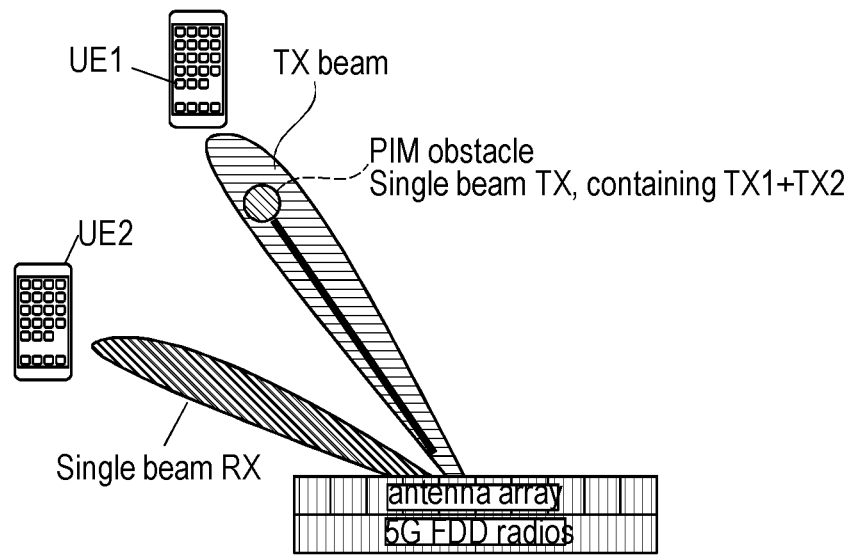
FIG. 8 is a block diagram illustrating an example for PIM avoidance.

FIG. 8 is a block diagram illustrating an example of PIM avoidance via scheduling of beams in accordance with a multiuser beamforming technique. In this example, the signals comprise uplink signals TX1 and TX2 and received signals comprise downlink RX signals. The beamforming settings of both the receiving antenna elements and the transmitting antenna elements are adapted so that separate beams serve at the same time both user equipment UE1 and UE2. Since the direction of the TX beam points towards a PIM obstacle, the scheduling may be performed so that the RX beam points into a different direction so that different UEs can be served the same time. As shown in FIG. 8, the TX beam with TX1 and TX2 signals serve user equipment UE1 and the RX beam serves user equipment UE2 at the same time. The beamforming settings of the transmitting antenna elements may be adapted in accordance with the present subject matter to avoid the PIM obstacle by e.g. notching or generating one or more shifted beams.

Figure 9:
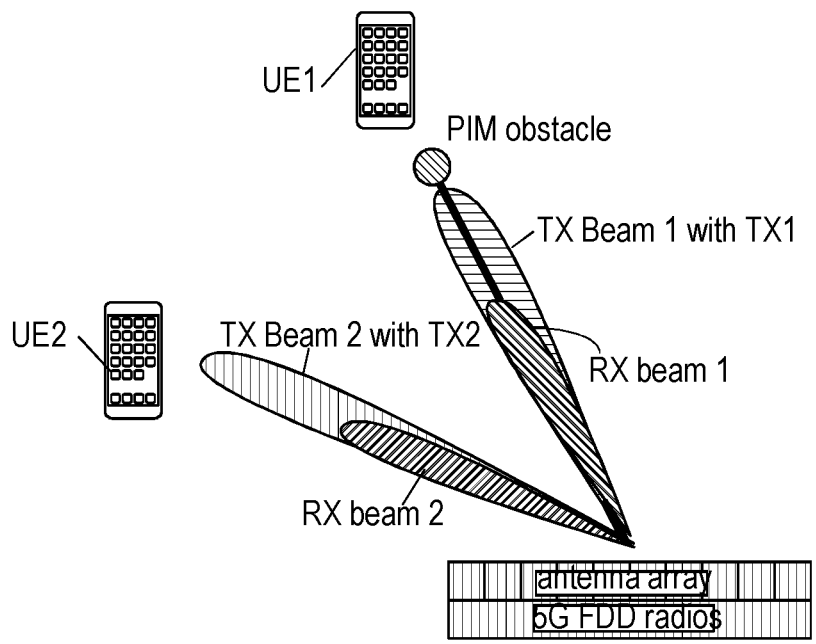
FIG. 9 is a block diagram illustrating an example for PIM avoidance.

FIG. 9 is a block diagram illustrating an example of PIM avoidance via scheduling of a multiuser beamforming. In the example of FIG. 9, downlink signals TX1 and TX2, causing PIM, may be scheduled in accordance with a multibeam method so that each set of downlink signals TX1 and TX2 can be transmitted in a respective beam TX beam1 and TX beam2 toward respective user equipment UE1 and UE2. In this case, the beams TX beam1 and TX beam2 may be formed in a way that they are not looking at the same time in the same PIM direction as indicated in FIG. 9. In addition, the receiver may be configured to receive two beams RX beam 1 and RX beam 2 from the user equipment UE1 and UE2 respectively.

Figure 10:
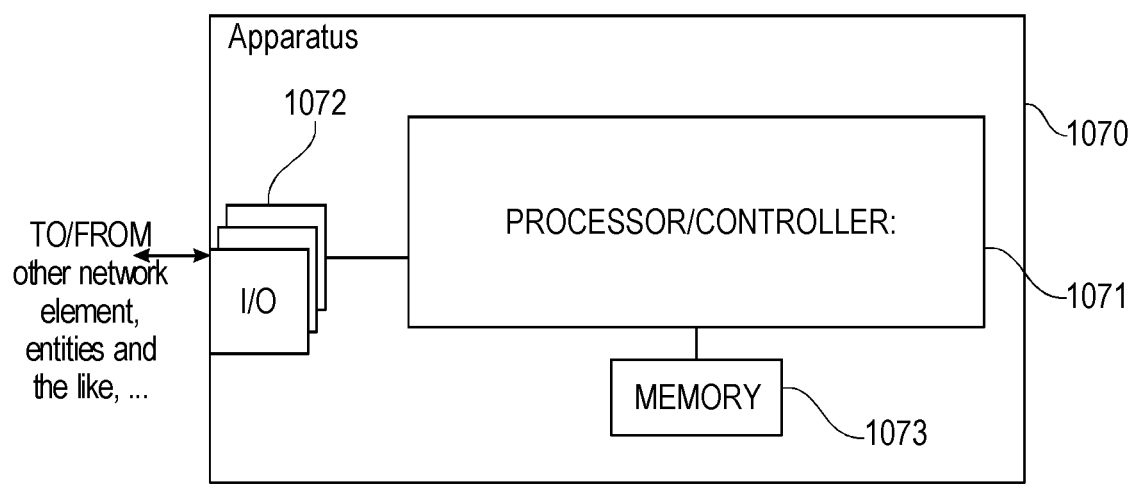
FIG. 10 is a block diagram showing an example of an apparatus according to an example of the present subject matter.

In FIG. 10, a block circuit diagram illustrating a configuration of an apparatus 1070 is shown, which is configured to implement at least part of the present subject matter. It is to be noted that the apparatus 1070 shown in FIG. 10 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus, or the like. The apparatus 1070 may comprise a processing function or processor 1071, such as a CPU or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements, or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIGS. 3, 5, 6A and 7A.

The processor 1071 is configured to determine a level of a PIM signal at a receiver of a communication system, identifying beam directions of a set of beam directions whose determined PIM level is higher than a predefined threshold and to adapt a beamforming of signals in at least part of the identified beam directions to mitigate the PIM level at the receiver.

The invention claimed is:

1. An apparatus, comprising:
at least one processor; and
at least one non-transitory memory
storing instructions that when executed by the at least one processor, cause the apparatus to:
for each beam direction of a set of beam directions of an antenna array of a communication system, determining a level of a passive intermodulation signal at a receiver of the communication system, the passive intermodulation signal being caused by a set of signals transmitted with the antenna array in the beam direction;
identifying one or more beam directions of the set of beam directions whose determined passive intermodulation level is higher than a predefined threshold; and
adapting a beamforming of signals in at least part of the identified beam directions to mitigate the passive intermodulation level at the receiver,
wherein the signals comprise signalling with a receiving device having a direction that coincides with at least one direction of the identified one or more beam directions, and
wherein the adapting comprises generating one or more beam directions which are closest directions to the direction of the receiving device and which do not coincide with the at least one direction of the identified beam directions.

2. The apparatus of claim 1, wherein the at least one non-transitory memory is storing instructions that when executed by the at least one processor, cause the apparatus to perform adapting beamforming settings of transmitting antenna elements of the antenna array in accordance with the generated directions, the at least part of the identified beam directions being the one direction of the identified beam directions.

3. The apparatus of claim 2, wherein the one or more generated beam directions are beam directions of a first beam of a subset of the signals to the receiving device, the at least one non-transitory memory storing instructions that when executed by the at least one processor, cause the apparatus to perform the adapting further comprising adapting beamforming settings of the transmitting antenna elements for forming a second beam for another subset of the signals to another receiving device, the second beam having a direction different from the generated directions.

4. The apparatus of claim 2, the signals further comprising uplink signals from a transmitting device, the at least one non-transitory memory storing instructions that when executed by the at least one processor, cause the apparatus to perform the adapting further comprising adapting beamforming settings of receiving antenna elements of the antenna array for forming a beam having a direction of the transmitting device different from the one direction of the identified beam directions.

5. The apparatus of claim 1, the signals comprising downlink signals to the receiving device, the at least one non-transitory memory storing instructions that when executed by the at least one processor, cause the apparatus to perform the adapting comprising adapting beamforming settings of transmitting antenna elements of the antenna array for notching a beam in each direction of the at least part of the identified beam directions.

6. The apparatus of claim 5, the at least part of the identified beam directions being a direction that coincides with the direction of the receiving device.

7. The apparatus of claim 5, the at least part of the identified beam directions being a direction that does not coincide with the direction of the receiving device and that is one of: a closest direction to the direction of the receiving device or a direction having a highest determined passive intermodulation level.

8. The apparatus of claim 5, the signals further comprising uplink signals from a transmitting device, the at least one non-transitory memory storing instructions that when executed by the at least one processor, cause the apparatus to perform the adapting further comprising adapting beamforming settings of receiving antenna elements of the antenna array for forming a beam having a direction of the transmitting device different from the at least part of the identified beam directions.

9. The apparatus of claim 1, the signals comprising uplink signals from a transmitting device, a direction of the transmitting device does not coincide with the at least part of the identified beam directions, the at least one non-transitory memory storing instructions that when executed by the at least one processor, cause the apparatus to perform the adapting comprising adapting beamforming settings of receiving antenna elements of the antenna array for notching a beam in each direction of the at least part of the identified beam directions.

10. The apparatus of claim 9, the at least part of the identified beam directions being a direction that does not coincide with the direction of the transmitting device and that is one of: a closest direction to the direction of the transmitting device or a direction having a highest determined passive intermodulation level.

11. The apparatus of claim 9, the signals further comprising downlink signals to the transmitting device, the at least one non-transitory memory storing instructions that when executed by the at least one processor, cause the apparatus to perform the adapting comprising adapting beamforming settings of transmitting antenna elements of the antenna array for notching a beam in each direction of the at least part of the identified beam directions.

12. The apparatus of claim 1, the at least one non-transitory memory storing instructions that when executed by the at least one processor, cause the apparatus to perform selecting the at least part of the identified beam directions based on the passive intermodulation levels.

13. The apparatus of claim 1, for each identified beam direction of the at least part of the identified beam directions, the at least one non-transitory memory storing instructions that when executed by the at least one processor, cause the apparatus to perform the adapting comprising adapting weightings of magnitudes and/or phases associated with the identified beam direction.

14. A system comprising:
an antenna array,
a receiver,
a transmitter, and
an apparatus, the apparatus being configured for:
for each beam direction of a set of beam directions of the antenna array, determining a level of a passive intermodulation passive intermodulation signal at the receiver, the passive intermodulation signal being caused by a set of signals transmitted with the antenna array in the beam direction;
identifying beam directions of the set of beam directions whose passive intermodulation level is higher than a predefined threshold; and
adapting a beamforming of signals in at least part of the identified beam directions to mitigate the passive intermodulation level at the receiver,
wherein the signals comprise signalling with a receiving device having a direction that coincides with at least one direction of the identified one or more beam directions, and
wherein the adapting comprises generating one or more beam directions which are closest directions to the direction of the receiving device and which do not coincide with the at least one direction of the identified beam directions.

15. The system of claim 14, wherein the antenna array comprises a number of antenna elements higher than a predefined minimum number of antenna elements.

16. A method for a communication system, comprising:
for each beam direction of a set of beam directions of an antenna array of the communication system, determining a level of a passive intermodulation passive intermodulation signal at a receiver of the communication system, the passive intermodulation signal being caused by a set of signals transmitted with the antenna array in the beam direction;
identifying beam directions of the set of beam directions whose passive intermodulation level is higher than a predefined threshold; and
adapting a beamforming of signals in at least part of the identified beam directions to mitigate the passive intermodulation level at the receiver,
wherein the signals comprise signalling with a receiving device having a direction that coincides with at least one direction of the identified one or more beam directions, and
wherein the adapting comprises generating one or more beam directions which are closest directions to the direction of the receiving device and which do not coincide with the at least one direction of the identified beam directions.

17. The method of claim 16, wherein the determining of the passive intermodulation levels and the identifying steps are performed in an offline calibration step, wherein the adapting step is performed in a real-time operation of the communication system.

18. A computer program encoded on a non-transitory computer readable medium comprising instructions stored thereon for causing an apparatus to perform at least the following:

for each beam direction of a set of beam directions of an antenna array of a communication system, determining a level of a passive intermodulation, signal at a receiver of the communication system, the passive intermodulation signal being caused by a set of signals transmitted with the antenna array in the beam direction;

identifying beam directions of the set of beam directions whose passive intermodulation level is higher than a predefined threshold; and adapting a beamforming of signals in at least part of the identified beam directions to mitigate the passive intermodulation level at the receiver, wherein the signals comprise signalling with a receiving device having a direction that coincides with at least one direction of the identified one or more beam directions, and wherein the adapting comprises generating one or more beam directions which are closest directions to the direction of the receiving device and which do not coincide with the at least one direction of the identified beam directions.

* * * * *